(Model.)

H. D. WOLCOTT.
SAW ARBOR.

No. 314,637. Patented Mar. 31, 1885.

WITNESSES:

INVENTOR:
H. D. Wolcott
BY Munn & Co
ATTORNEYS.

UNITED STATES PATENT OFFICE.

HYMAN D. WOLCOTT, OF WRIGHT'S, PENNSYLVANIA.

SAW-ARBOR.

SPECIFICATION forming part of Letters Patent No. 314,637, dated March 31, 1885.

Application filed August 13, 1884. (Model.)

*To all whom it may concern:*

Be it known that I, HYMAN D. WOLCOTT, of Wright's, in the county of McKean and State of Pennsylvania, have invented a new and Improved Saw-Arbor, of which the following is a full, clear, and exact description.

My invention consists in an arbor for circular saws, constructed to accurately center the saw and clamp it in a manner to prevent springing or dishing of the plate, as hereinafter described and claimed.

Reference is to be had to the accompanying drawings, forming a part of this specification, in which similar letters of reference indicate corresponding parts in both the figures.

Figure 1:
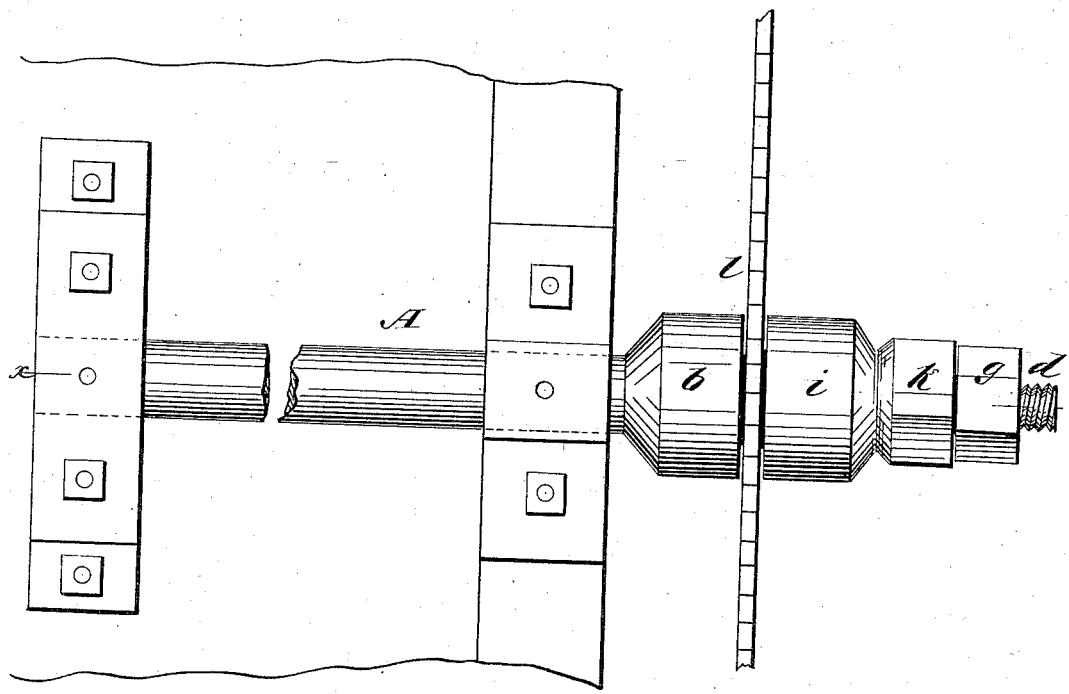
Figure 2:
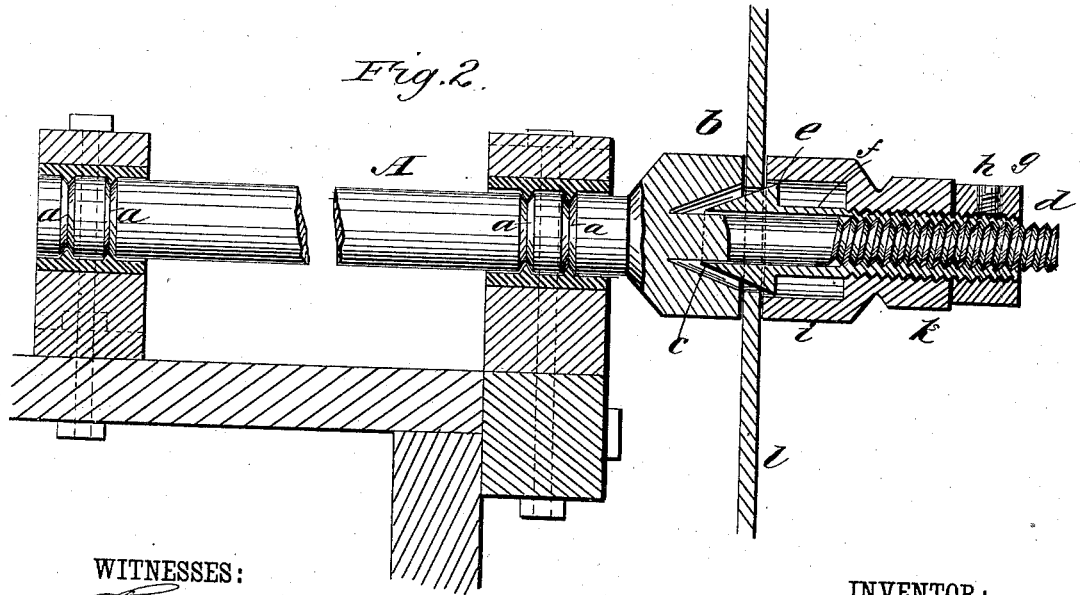

Figure 1 is a plan view of a bench with the arbor, and Fig. 2 is a sectional side view of the same.

A is a shaft formed with annular V-form grooves $a$, that are engaged by ribs on the boxes in which the shaft is sustained, so as to prevent any endwise movement of the shaft.

$b$ is a collar shrunk on the end of shaft A, and having its outer face turned true and counterturned to form a tapering recess, $c$, of suitable depth around a spindle, $d$, that projects from the center of the collar, and which has a screw-thread cut upon it.

$e$ is a cone bored to fit spindle $d$, and attached to or forming part of a sleeve, $f$, that is threaded to fit the screw on the spindle.

$g$ is a nut clamped on the outer end of sleeve $f$ by a set-screw, $h$, for use in turning the sleeve.

$i$ is a collar formed in one piece with a nut, $k$, taking an external left-hand thread on sleeve $f$, and having a recess in its end of a size to receive the cone $e$.

By applying a wrench to nut $k$, the collar $i$, sleeve $f$, and cone $e$ can be removed together from the spindle. The saw as represented at $l$ is then put on the spindle, the sleeve $f$, with collar $i$, replaced, and the sleeve screwed upon the spindle by a wrench applied to its nut $g$, so that the cone $e$ enters the eye of the saw-plate and clamps the saw against the collar $b$. Nut $k$ is then turned to clamp the edges of collar $i$ against the saw. The nut $g$ may then be loosened and set up against the nut $k$. The cone brings the saw to a central position on the arbor and prevents any aftershifting, while the clamping-collar $i$, bearing outside the eye, prevents springing or dishing from pressure on the saw.

This arbor is adapted for use in jointing-machines, in which the saw must be held accurately, and in other machines for holding and clamping a saw reliably.

Having thus described my invention, I claim as new and desire to secure by Letters Patent—

The arbor A, formed with a recessed collar, $b$, and a screw-threaded spindle, $d$, extending from said collar, the sleeve $f$, screw-threaded internally and externally, and formed with a cone, $e$, at its forward end, the recessed collar $i$, extending over cone $e$ and formed with a nut, $k$, fitting on the exterior of sleeve $f$, and the nut $g$ on the outer end of sleeve $f$, substantially as set forth.

HYMAN D. WOLCOTT.

Witnesses:
S. W. SMITH,
JAS. V. OTTO.